Feb. 18, 1964   A. E. BUNEL   3,121,358
FEELERS FOR COPYING DEVICES FOR MACHINE
TOOLS AND APPLICATIONS
Filed May 13, 1960   2 Sheets-Sheet 1

Inventor
ANDRÉ EMILE BUNEL

By Toulmin & Toulmin
Attorneys

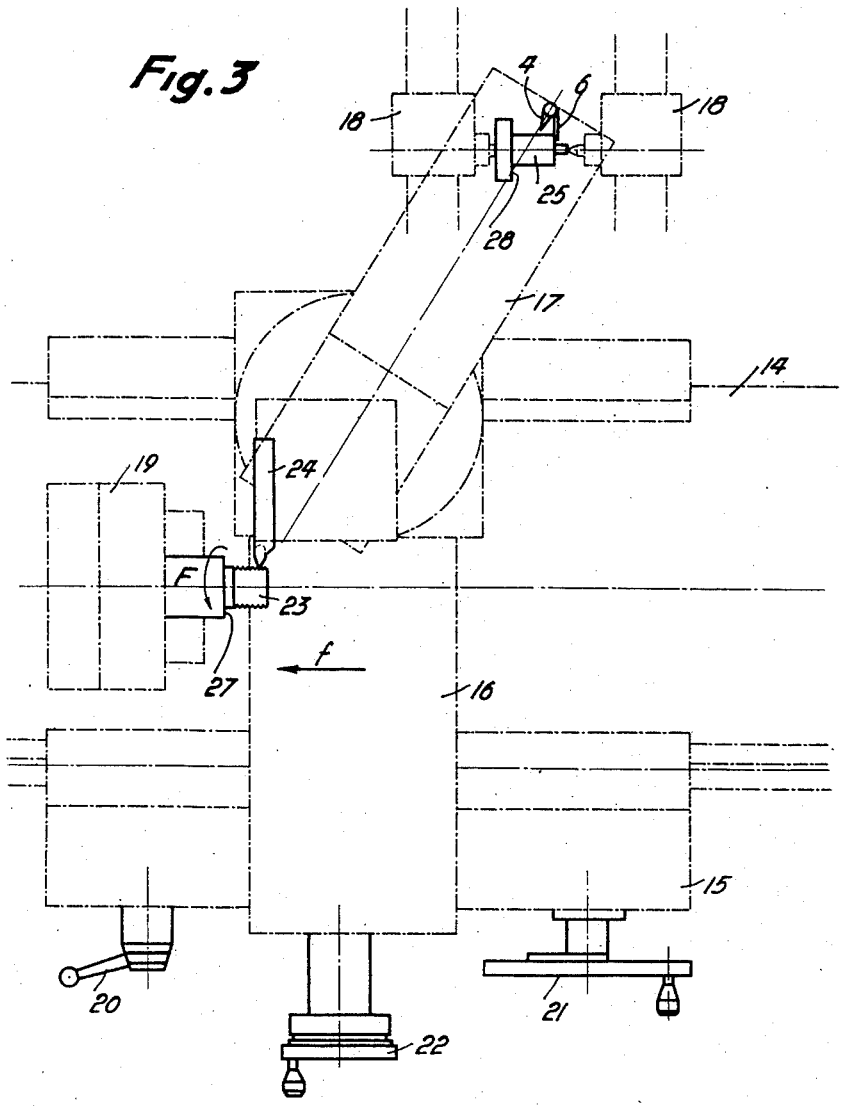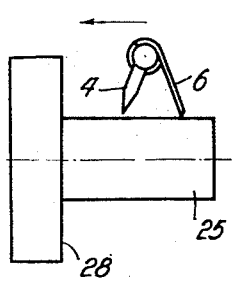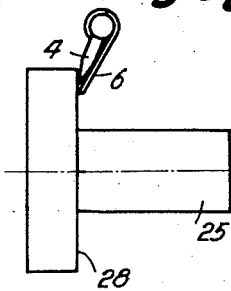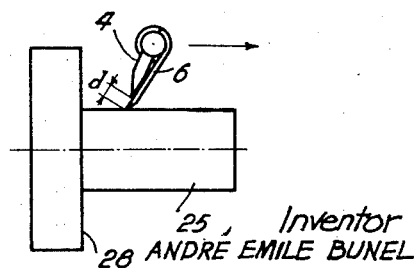

United States Patent Office 3,121,358
Patented Feb. 18, 1964

3,121,358
FEELERS FOR COPYING DEVICES FOR MACHINE
TOOLS AND APPLICATIONS
André Emile Bunel, Bondy, France, assignor to Etablissements A. Cazeneuve, La Plaine-Saint-Denis, France, a French company
Filed May 13, 1960, Ser. No. 29,106
Claims priority, application France May 25, 1959
8 Claims. (Cl. 82—14)

The present invention relates to feelers of copying devices used in machine tools and particularly in lathes. In these machines the feeler explores or follows over a model or template in both the longitudinal and transverse direction and causes a copying device carrying the tool to effect an identical displacement. This occurs both during the working travel of the tool and during the return travel for effecting a new cut or operation. Thus during the return travel, the tool rubs along the machined work and scratches it. This is particularly disadvantageous when forming a screw thread. This disadvantage is still more serious in the case of screw threads machined by using the lead-screw of a manually controlled machine lathe and a smooth model; for the tool can only be maintained in its withdrawn position during the return travel by a manual transverse displacement of the tool-carrying saddle at the end of the working travel, which constitutes loss of time, results in withdrawal of the tool at variable points of the work from one travel to another and requires close attention on the part of the operator which causes fatigue and a drop in output. Further, for this reason, the screw cutting cannot be carried out at the maximum speeds possible with silicon carbide tools.

The object of the present invention is to avoid these disadvantages. To this end, there are associated with the feeler auxiliary means which are responsive to the direction of displacement of the feeler along the copying model or template and co-operate with said copying device in such manner as to be inoperative thereon during the working travel of the tool controlled by the copying device but to maintain during the whole of the return travel of the tool the copying device in a position corresponding to a withdrawn position of the tool after the latter has been withdrawn at the end of the travel by the action of the model on the feeler.

In an advantageous embodiment, said means comprise an auxiliary feeler which is for example pivotable, and is furthermore carried by the main feeler and elastically biased toward a position of rest and extending beyond the point of the main feeler in the latter position.

An advantageous application of the aforementioned improvements consists in a method of withdrawing the tool by a copying device at the end of the working travel of the tool, said method comprising the use of a feeler provided with the aforementioned auxiliary means and the provision on the model or template co-operating with the feeler of a shoulder located at a point of the model corresponding to the end of the working travel of the tool, the height of the shoulder exceeding the greatest transverse dimension of the profile of the model. In this way, scratching of the work by the tool during the return travel of the latter is avoided.

An advantageous development of this method, consists in its application in the machining of a screw-thread on a manually controlled machine lathe by use of the lead-screw of the lathe and, for co-operating with the feeler, a smooth model, said shoulder of which has a height exceeding the depth of the screw threading to machine. The withdrawal of the tool at the end of travel occurs thus automatically and precisely, always at the same point on the work which permits the very high cutting speeds possible with carbide tools and use of the latter at maximum efficiency.

This important advantage affords, in addition to great safety in execution, a considerable reduction in the cost price of the screw threads.

Further, the attention required of the operator and his fatigue are greatly reduced, since all that he needs to do manually is to operate the return travel of the tool up to the initial indexed position, to advance the tool-carrying carriage the depth of the new cut to be effected and to engage the saddle.

The accompanying drawings and the ensuing description, given merely by way of example, permit an understanding of the device according to the invention.

FIG. 3 is a plan view of a partial layout of a machine lathe provided with the compound feeler, and FIGS. 4a, 4b, 5a, 5b, 6a, 6b are views of the various characteristic positions of the compound feeler and the tool during various operational stages.

Figure 1:
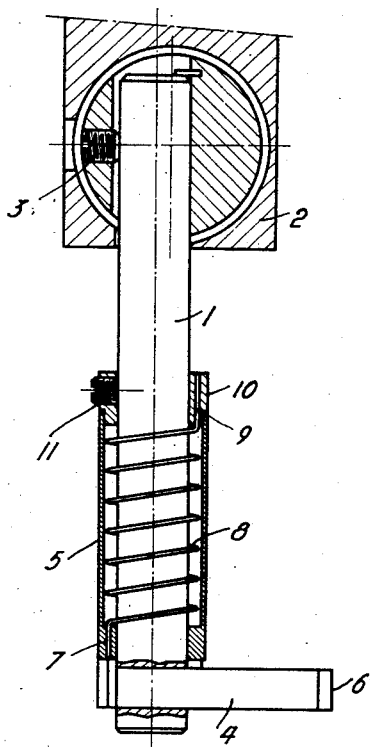
FIG. 1 is a vertical view of the feeler which will be hereinafter termed, for convenience, "compound feeler"
Figure 2:
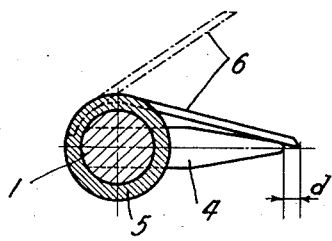
FIG. 2 is a plan view thereof.

FIG. 1 shows the feeler carrier 1 which is detachably mounted in the copying device 2 and held fast by a screw 3 and in which the main feeler 4 is engaged. A tubular element 5, on which is mounted by suitable means the auxiliary feeler 6, is mounted coaxially on the carrier 1. Anchored in the end of the element 5 is the end 7 of a spring 8 whose other end is engaged in a bushing 10 which can be held in a suitable position on the carrier 1 by a screw 11. The tubular element 5 is rotatable on the bushing 10 and on the carrier 1. The spring 8 can be put under a variable torsional stress by a variable rotation of the bushing 10 so that the auxiliary feeler 6 bears with a suitable force against the main feeler 4, as shown in FIG. 2. The auxiliary feeler 6 extends beyond the main feeler 4 a distance $d$. The auxiliary feeler 6 is capable, as shown in dot-dash line in FIG. 2, of separating from the main feeler 4 toward which latter it is biased elastically by the spring 8, thereby constituting the assembly termed compound feeler.

FIG. 3 shows the relative positions on a lathe of the compound feeler, the model, the tool and the work to machine.

There will now be described by way of a characteristic example the arrangement of the device in the case of cutting screw threading not by copying but by using the lead-screw of a lathe.

There are shown partially, in dot-dash line, a lathe bed 14, a saddle 15, a cross slide 16, a copying device 17, adjustable supports 18 for the model 25, a chuck 19 and, in full line, the saddle clutch control lever 20, the hand wheel 21 for shifting the saddle 15, the vernier wheel 22 controlling the cross slide 16, the work to machine 23 gripped in the chuck 19, the screw thread cutting tool 24 clamped on the copying device 17, the model 25 placed between the adjustable supports 18 and the compound feeler 4, 6 mounted on the copying device 17. The rotation occurs in the direction of arrow F and the cutting of the screw thread in the direction of arrow $f$. The copying device 17 is of the type described in the French Patent No. 1,098,467 dated April 16, 1954.

The work to be screw threaded 23 is, in the presently described embodiment, provided with a shoulder 27 against which the screw thread cutting tool must in no case abut during the cutting of the screw thread; the latter must always stop at the same position.

In order to regulate the relative positions of the various elements, work pieces or tools involved, the following procedure is adopted.

The work pieces such as 23 to be produced in small or medium batches are always gripped in the chuck 19 in an identical position and the setting is taken from the first work piece.

To obtain this, the copying device 17 being in its end-of-travel position, the thread cutting tool 24 is shifted, by shifting the saddle 15, to a position near the shoulder 27, a suitable small clearance being left, and the point of the thread cutting tool 24 is brought to touch the outside diameter of the work piece 23 by shifting the cross-slide 16 by means of the vernier hand wheel 22. By means of the adjustable supports 18, the model 25 is displaced so that its face 28, which corresponds to the shoulder 27 of the piece, touches the main feeler 4 thereby putting the latter in the position in which the copying device 17 commences to shift back the tool 24, then the model 25 is moved away from the main feeler 4, transversely of the model, a distance exceeding the height of the screw thread to cut, the contact between the face 28 and the main feeler 4 being maintained. The model 25 is then clamped in the position thus obtained and the device is in position for cutting the screw thread.

Figure 4A:
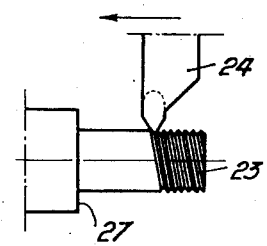
Figure 5A:
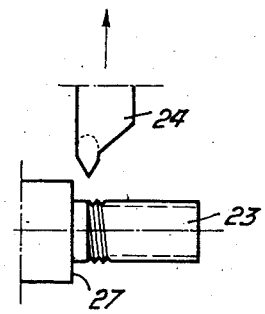

To this end, the saddle 15 is shifted so as to shift the tool 24 to the right in front of the piece 23, the depth of cut is adjusted by the vernier 22 and by means of the lever 20 the saddle 15 is engaged and is caused to travel from the right to the left, carrying along therewith the copying device 17 and consequently the tool 24 and the compound feeler 4, 6. The screw thread is then commenced, as shown in FIG. 4a, while the compound feeler 4, 6 moves along the model 25, as shown in FIG. 4b. It can be seen that the main feeler 4 does not touch the model and the auxiliary feeler 6 rubs therealong in elastically moving away from the main feeler 4. This continues until the moment the main feeler 4 touches the face 28 of the model. This touching actuates the copying device 17 and causes its return movement which withdraws the tool 24 from the screw thread and permits the auxiliary feeler 6, which is biased by the spring 8, to bear against the main feeler, as shown in FIGS. 5a and 5b.

Figure 6A:
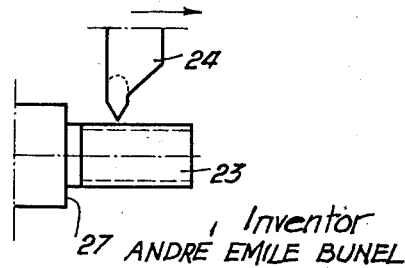

As soon as the tool 24 has been withdrawn, the saddle is disengaged and returned toward the right to its initial indexed position where the tool 24 is in front of the piece 23. This operation is shown in FIGS. 6a and 6b where it is seen that the auxiliary feeler 6 rubs against the model 25 and thus acts on the main feeler and, as its length exceeds that of the main feeler, it maintains the copying device 17 withdrawn so that the tool 24 is thus held away from the piece 23 a sufficient distance to clear the screw thread in accordance with the preceding setting.

With the tool 24 in its position of departure, the depth of the following cut is set by the vernier 22, the saddle 15 is once more engaged and the following procedure is repeated and so on until the required screw thread has been fully cut.

It must be understood that the scope of the present invention is not limited to the embodiments described by way of example, but embraces any device which is analogous or similar, wholy or in part, to the described embodiments and furthermore embraces any machine including the application of the foregoing mechanisms and any use thereof for any type of machining.

What I claim is:

1. In a device for controlling the transverse motion of a tool carrying slide across a longitudinally reciprocable saddle in a machine tool, including a stationary templet, a feeler adapted to be carried by said saddle and be reciprocated together with the latter along said templet in order to cooperate therewith, stationary slide actuating means responsive to said feeler thereby automatically to actuate said tool carrying slide away from a work piece for a predetermined relative engaging position of said feeler and templet, whereby moving said tool out of engagement with the work piece, and restraining means adapted to restrain said actuating means from moving said slide back towards the work piece upon disengagement of the feeler from the templet, said restraining means comprising a movable finger carried by the feeler and adapted to move into a position where it extends beyond the sensing feeler end and in abutting engagement with the templet against the thrust of said actuating means whereas the feeler is out of engagement with said templet, spring means biasing said finger to urge it toward said abutting position, said movable finger being further adapted to be moved and retained by said templet against said spring means out of said abutting position by reengagement with said templet upon disengagement therefrom during return stroke of the saddle, said finger being thus swept along said templet during machining strokes of the saddle.

2. A device as in claim 1, further comprising means for adjusting at will the biasing action of said spring means on said finger.

3. In a device as in claim 1, said finger being pivoted to said feeler to be swingable about an axis transverse to the saddle reciprocating motion.

4. In a device as in claim 3, a sleeve rotatably fitted onto said feeler and carrying said finger.

5. In a device as in claim 3, said sleeve providing around said feeler a recess housing said spring means, the latter being a torsional spring one end of which is fixed to an end of the sleeve, a collar onto said feeler, and a screw securing said collar to the feeler, the other end of said spring being secured to said collar.

6. In a device as in claim 5, said collar being rotatably fitted onto said feeler and said screw being a set screw, whereby the finger may be rotated around the feeler and secured thereto in various positions.

7. A device as in claim 1, wherein said finger and spring means are connected to form a bodily removable unit removably fitted on the feeler.

8. In a device as in claim 1, said finger being pivoted to the feeler to swing about an axis transverse to the saddle recirpocating motion and said abutting and disengaged positions of the finger being respectively situated on one and the other side of a plane containing said axis and perpendicular to the direction of said saddle reciprocating motion.

References Cited in the file of this patent

UNITED STATES PATENTS

| | | |
|---|---|---|
| 1,393,205 | Daniels | Oct. 11, 1921 |
| 2,752,827 | Ernst | July 3, 1956 |